US012031342B2

(12) United States Patent
Lazzari et al.

(10) Patent No.: US 12,031,342 B2
(45) Date of Patent: Jul. 9, 2024

(54) HOIST PLATFORM SYSTEM FOR MULTI-FLOOR BUILDING CONSTRUCTION

(71) Applicant: LINK LIFT IP PTY LTD, St. Kilda Vic (AU)

(72) Inventors: Sam Lazzari, St. Kilda Vic (AU); Silas Warhurst, St. Kilda Vic (AU); Richard Burchell, Newtown (AU)

(73) Assignee: LINK LIFT IP PTY LTD, Victoria (AU)

( * ) Notice: Subject to any disclaimer, the term of this patent is extended or adjusted under 35 U.S.C. 154(b) by 587 days.

(21) Appl. No.: 16/761,228

(22) PCT Filed: Nov. 2, 2018

(86) PCT No.: PCT/AU2018/051193

§ 371 (c)(1),
(2) Date: May 1, 2020

(87) PCT Pub. No.: WO2019/084627

PCT Pub. Date: May 9, 2019

(65) Prior Publication Data

US 2020/0347622 A1 Nov. 5, 2020

(30) Foreign Application Priority Data

Nov. 3, 2017 (AU) ................................ 2017904476

(51) Int. Cl.

| | |
|---|---|
| ***E04G 21/16*** | (2006.01) |
| ***B66C 23/20*** | (2006.01) |
| *B66D 3/18* | (2006.01) |

(52) U.S. Cl.

CPC .......... *E04G 21/166* (2013.01); *B66C 23/201* (2013.01); *B66D 3/18* (2013.01)

(58) Field of Classification Search

CPC ..... E04G 3/28; E04G 2003/283; E04G 21/14; E04G 21/166; B66C 23/20; B66C 23/201; B66C 23/203; B66C 23/26; F16M 11/048

(Continued)

(56) References Cited

U.S. PATENT DOCUMENTS 3,508,667 A * 4/1970 Commora ............... B66C 13/06 254/409
5,934,437 A * 8/1999 Anson ................... B66C 23/202 193/15

(Continued)

FOREIGN PATENT DOCUMENTS

CN 205440776 U * 8/2016
CN 105971293 A * 9/2016 ............. E04G 21/14

(Continued)

OTHER PUBLICATIONS

APO—Notification of International Search Report for related International Appln. No. PCT/AU2018/051193 mailed on Jan. 15, 2019, 15 pgs.

(Continued)

*Primary Examiner* — Ryan D Kwiecinski
(74) *Attorney, Agent, or Firm* — Ruggiero McAllister & McMahon LLC

(57) ABSTRACT

A master hoisting platform, comprising: an outer frame removably installable inside a floor of a multi-floor building under construction; and an inner frame slidable in the outer frame between a retracted position inside the floor and an extended position outside the floor; wherein the inner frame comprises a framework structure to mount a hoist comprising a winch positioned rearwardly above the inner frame, and a sheave positioned forwardly above the inner frame.

3 Claims, 9 Drawing Sheets

(58) Field of Classification Search
USPC ......... 212/179; 182/223; 414/592, 609, 659, 414/660
See application file for complete search history.

(56) References Cited

U.S. PATENT DOCUMENTS

| | | | | |
|---|---|---|---|---|
| 6,575,685 | B2 * | 6/2003 | Baxter, Sr. | E04G 21/166 414/609 |
| 7,048,491 | B2 * | 5/2006 | Windbergs | B66C 23/206 212/315 |
| 7,070,020 | B2 * | 7/2006 | Preston | E04G 3/28 182/82 |
| 8,522,922 | B1 * | 9/2013 | Stokes | B63B 27/14 114/353 |
| 9,255,416 | B1 * | 2/2016 | Snell | B66C 23/06 |
| D768,950 | S * | 10/2016 | McKeon | E04G 21/166 D34/28 |
| 9,701,520 | B2 * | 7/2017 | Pruskauer | B66D 1/605 |
| 10,106,995 | B2 * | 10/2018 | Snell | B66C 23/201 |
| 10,280,637 | B2 * | 5/2019 | McKeon | E04G 3/28 |
| 10,633,876 | B2 * | 4/2020 | Liggins | E04G 21/166 |
| 10,703,591 | B2 * | 7/2020 | Preston | B65G 69/22 |
| 10,934,727 | B2 * | 3/2021 | Snell | B66C 23/26 |
| 2003/0029825 | A1 * | 2/2003 | Baxter, Sr. | B66C 23/201 212/179 |
| 2009/0020362 | A1 * | 1/2009 | Diaz | E04G 21/16 182/113 |
| 2011/0147329 | A1 * | 6/2011 | Evans | E04G 21/166 254/266 |
| 2014/0119866 | A1 * | 5/2014 | Pruskauer | B66C 23/26 414/609 |
| 2015/0152656 | A1 * | 6/2015 | McKeon | E04G 3/28 414/800 |
| 2016/0258172 | A1 | 9/2016 | Snell et al. | |
| 2020/0173185 | A1 * | 6/2020 | Snell | B66C 23/82 |

FOREIGN PATENT DOCUMENTS

| | | | | |
|---|---|---|---|---|
| CN | 106382014 | A * | 2/2017 | E04G 21/166 |
| CN | 109113353 | A * | 1/2019 | E04G 21/162 |
| CN | 111691686 | A * | 9/2020 | |
| CN | 112878705 | A * | 6/2021 | E04G 21/166 |
| CN | 111962879 | B * | 10/2021 | E04G 21/166 |
| CN | 114109049 | A * | 3/2022 | E04G 21/166 |
| FR | 2999208 | A1 * | 6/2014 | E04G 21/166 |
| JP | 59-007687 | A | 1/1984 | |
| WO | WO-9506794 | A1 * | 3/1995 | E04G 21/14 |
| WO | 1998-047808 | A1 | 10/1998 | |
| WO | 2017-075654 | A1 | 5/2017 | |

OTHER PUBLICATIONS

APO—International Preliminary Report on Patentability for the related International Appln. No. PCT/AU2018/051193 mailed on Jan. 22, 2020, 10 pgs.

* cited by examiner

HOIST PLATFORM SYSTEM FOR MULTI-FLOOR BUILDING CONSTRUCTION

CROSS-REFERENCE TO RELATED APPLICATIONS

The present application is a United States National Phase under 35 U.S.C. § 371 of International Application No. PCT/AU2018/051193 entitled "HOIST PLATFORM SYSTEM FOR MULTI-FLOOR BUILDING CONSTRUCTION" and filed on Nov. 2, 2018, which claims the benefit of and priority to Australian Patent Application No. 2017904476 filed Nov. 3, 2017, the entire disclosures of each of which are hereby incorporated by reference herein.

FIELD

The present invention relates to a hoist platform system for multi-floor building construction.

BACKGROUND

Multi-floor buildings are typically constructed using tower cranes to lift and lower building materials, tools and waste into retractable loading platforms installed on different floors.

Tower cranes and conventional retractable loading platforms have several drawbacks. Tower cranes are commonly a bottleneck in building construction projects that increase overall build time and cost. Tower crane operation also requires safe wind conditions and skilled personnel which further increase build time and cost. In addition, conventional retractable loading platforms typically have a framework structure that prevents side loading and unloading when retracted inside floors of buildings.

In this context, there is a need for improved solutions for lifting and lowering loads during construction of multi-floor buildings.

SUMMARY

According to the present invention, there is provided a master hoisting platform, comprising:

- an outer frame removably installable inside a floor of a multi-floor building under construction; and
- an inner frame slidable in the outer frame between a retracted position inside the floor and an extended position outside the floor;
- wherein the inner frame comprises a framework structure to mount a hoist comprising a winch positioned rearwardly above the inner frame, and a sheave positioned forwardly above the inner frame.

The inner frame may further comprise a floor plate below the winch, and an opening below the sheave.

The opening may be configured to vertically receive a loading bin.

The outer frame may extend at least partly beyond an edge of the floor of the multi-floor building.

The hoist may be positioned completely inside the edge of the floor of the multi-floor building when the inner frame is in the retracted position.

The sheave and the opening in the inner frame may be positioned completely outside the edge of the floor of the multi-floor building when the inner frame is in the extended position.

The sheave may be horizontally movable relative to the edge of the floor via a chain drive mechanism mounted to an upper forward portion of the inner frame.

The outer frame may comprise a pair of parallel spaced apart I-beams.

A pair of props may be spaced apart from one another on each I-beam, and each prop may be inwardly foldable from a vertical position to a horizontal position inside the outer frame.

The present invention also provides a slave loading platform, comprising:

- an outer frame removably installable inside a floor of a multi-floor building under construction; and
- an inner frame slidable in the outer frame between a retracted position inside the floor and an extended position outside the floor;
- wherein the inner frame comprises a floor plate having a hand rail structure with at least one side-opening gate.

The present invention further provides a hoist platform system, comprising:

- a master hoisting platform removably installed inside an upper floor of a multi-floor building under construction; and
- at least one slave loading platform removably installed below the master hoisting platform in a lower floor of the multi-floor building.

The present invention also provides a method, comprising using the hoist platform system described above to lift and lower loads during construction of a multi-floor building.

BRIEF DESCRIPTION OF DRAWINGS

Embodiments of the invention will now be described by way of example only with reference to the accompanying drawings, in which.

DESCRIPTION OF EMBODIMENTS

Figure 1:
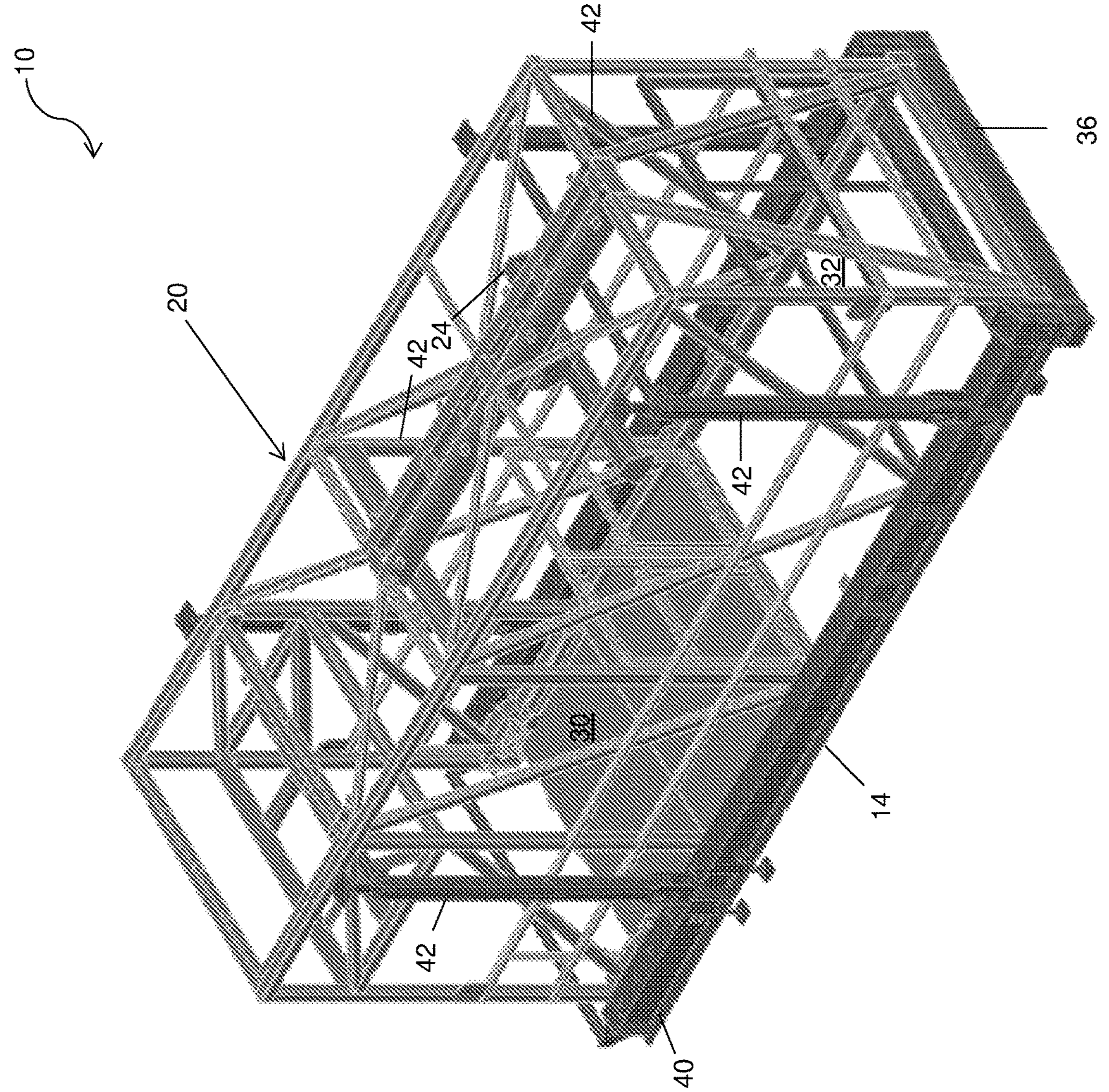
FIG. 1 is a perspective view of a master hoisting platform according to an embodiment of the present invention in a retracted position.
Figure 2:
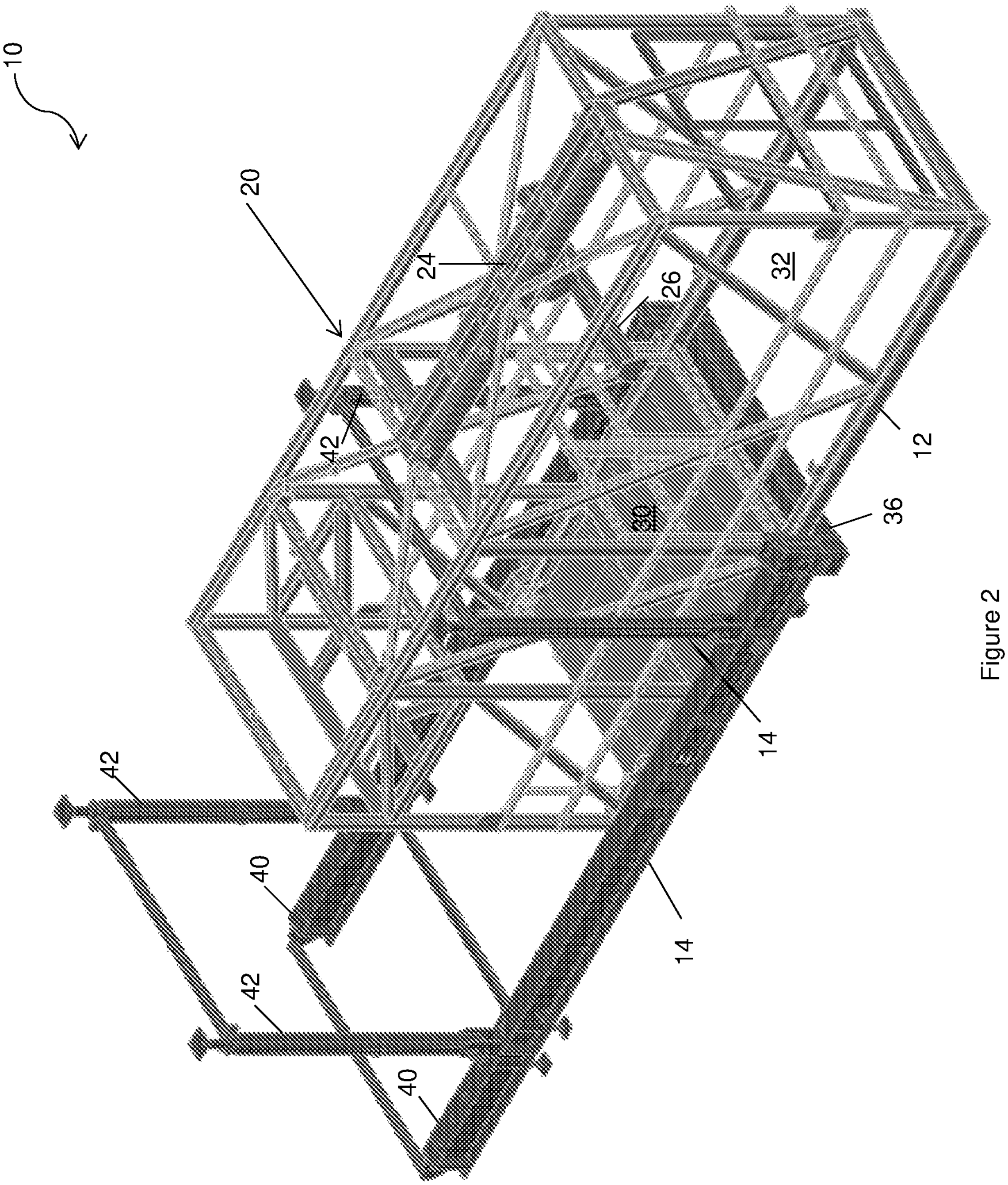
FIG. 2 is a perspective view of the master hoisting platform in an extended position.
Figure 3:
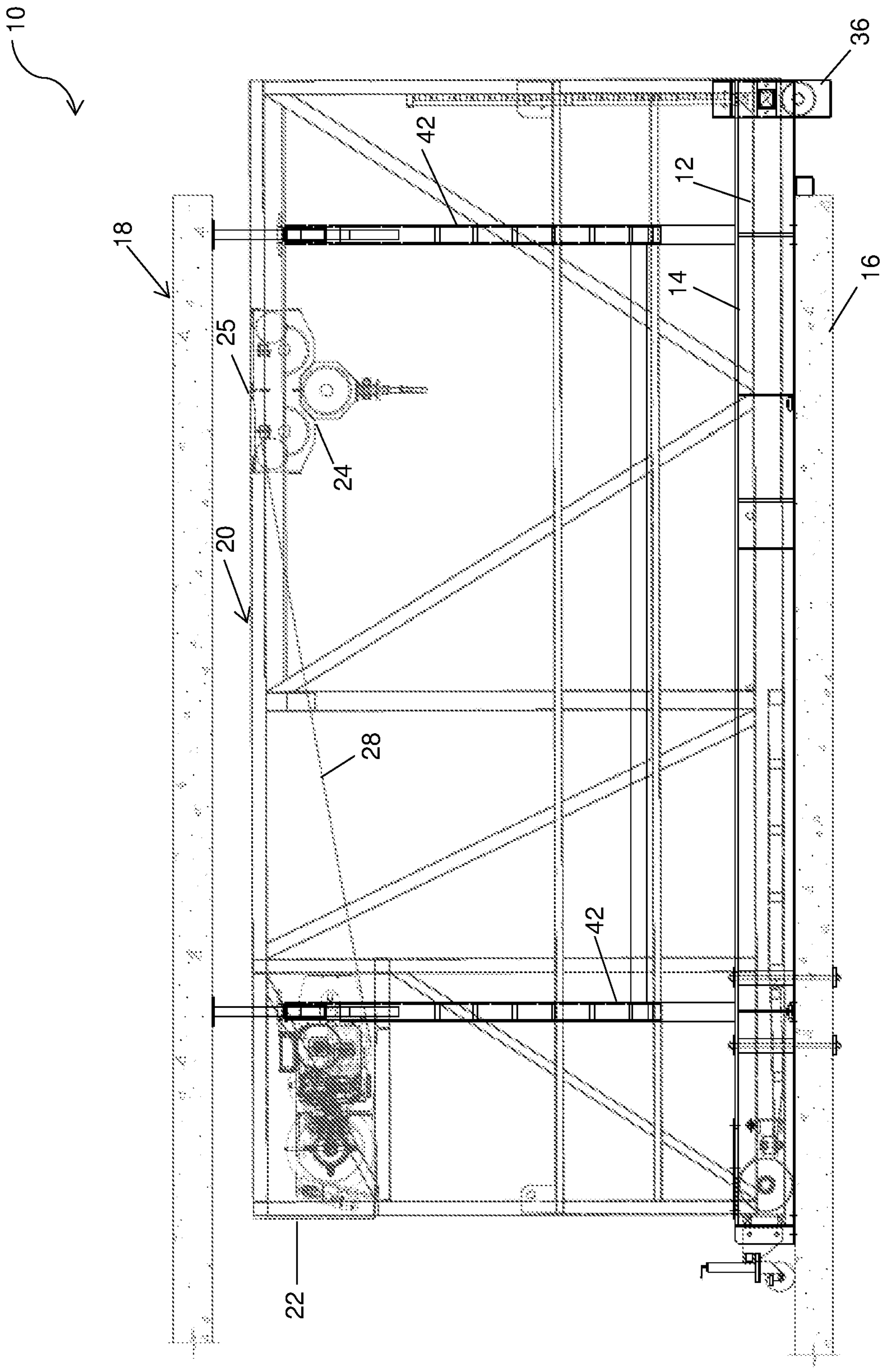
FIG. 3 is a side view of the master hoisting platform in a retracted position.
Figure 4:
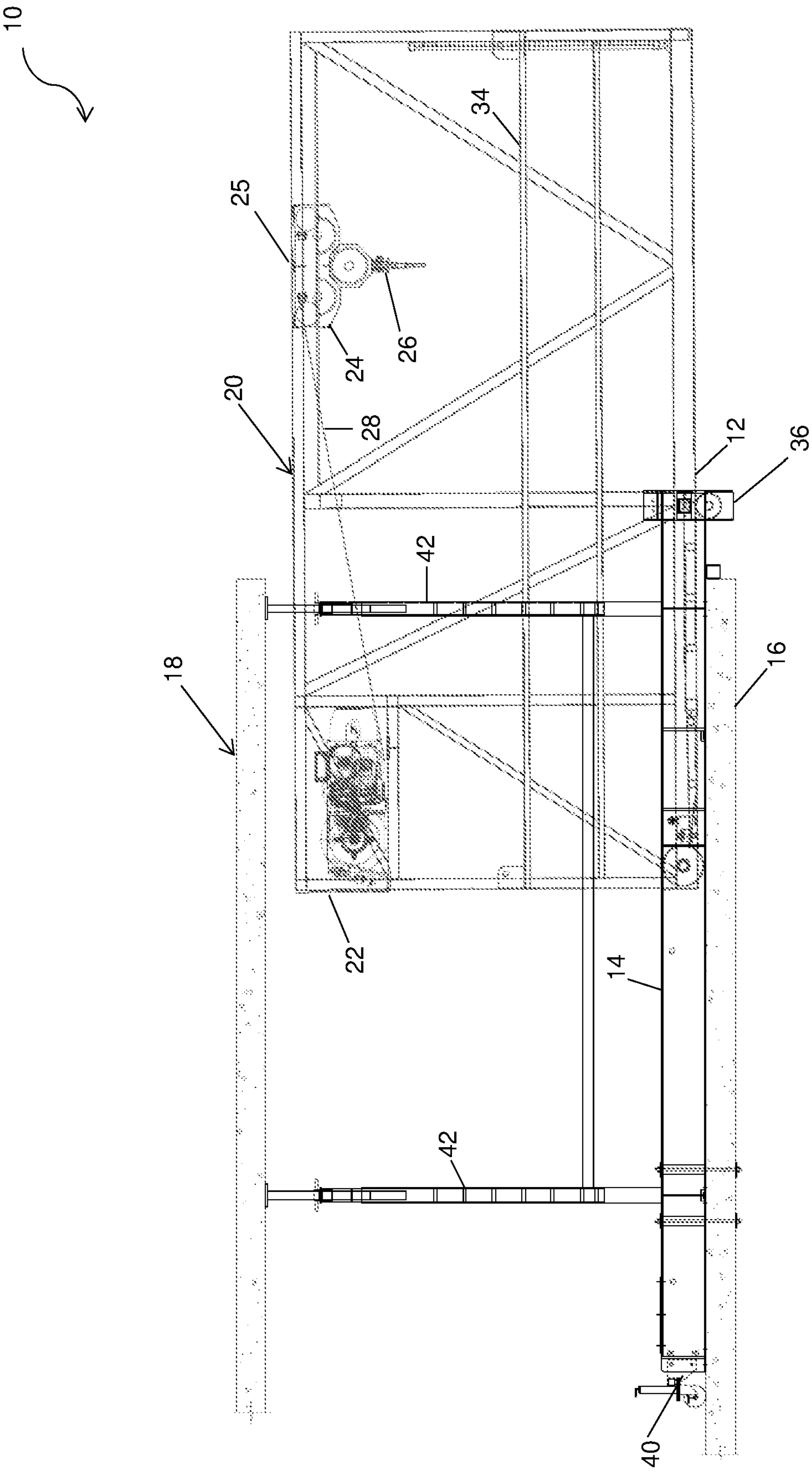
FIG. 4 is a side view of the master hoisting platform in an extended position.
Figure 5:
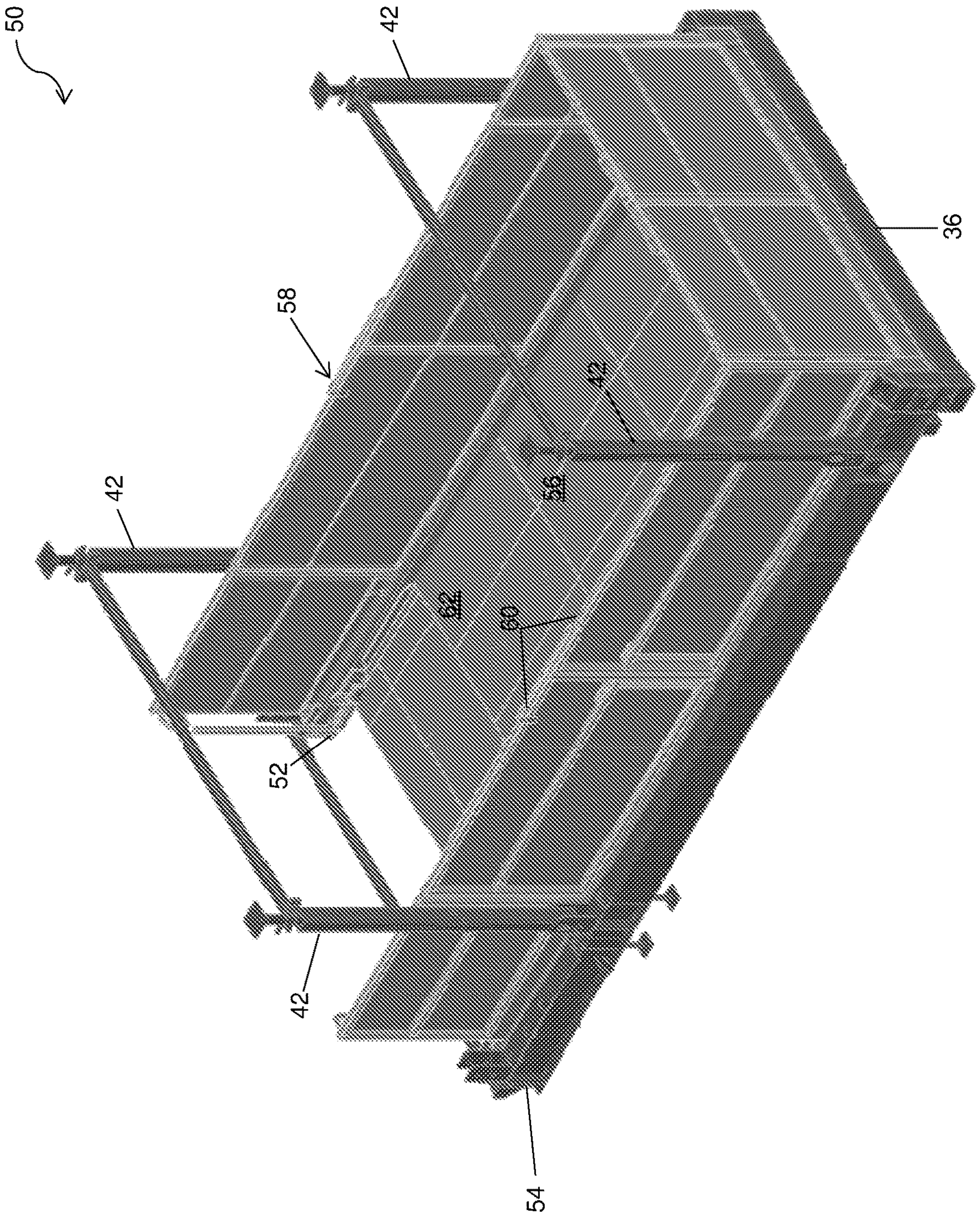
FIG. 5 is a perspective view of a slave loading platform according to another embodiment of the present invention in a retracted position.
Figure 6:
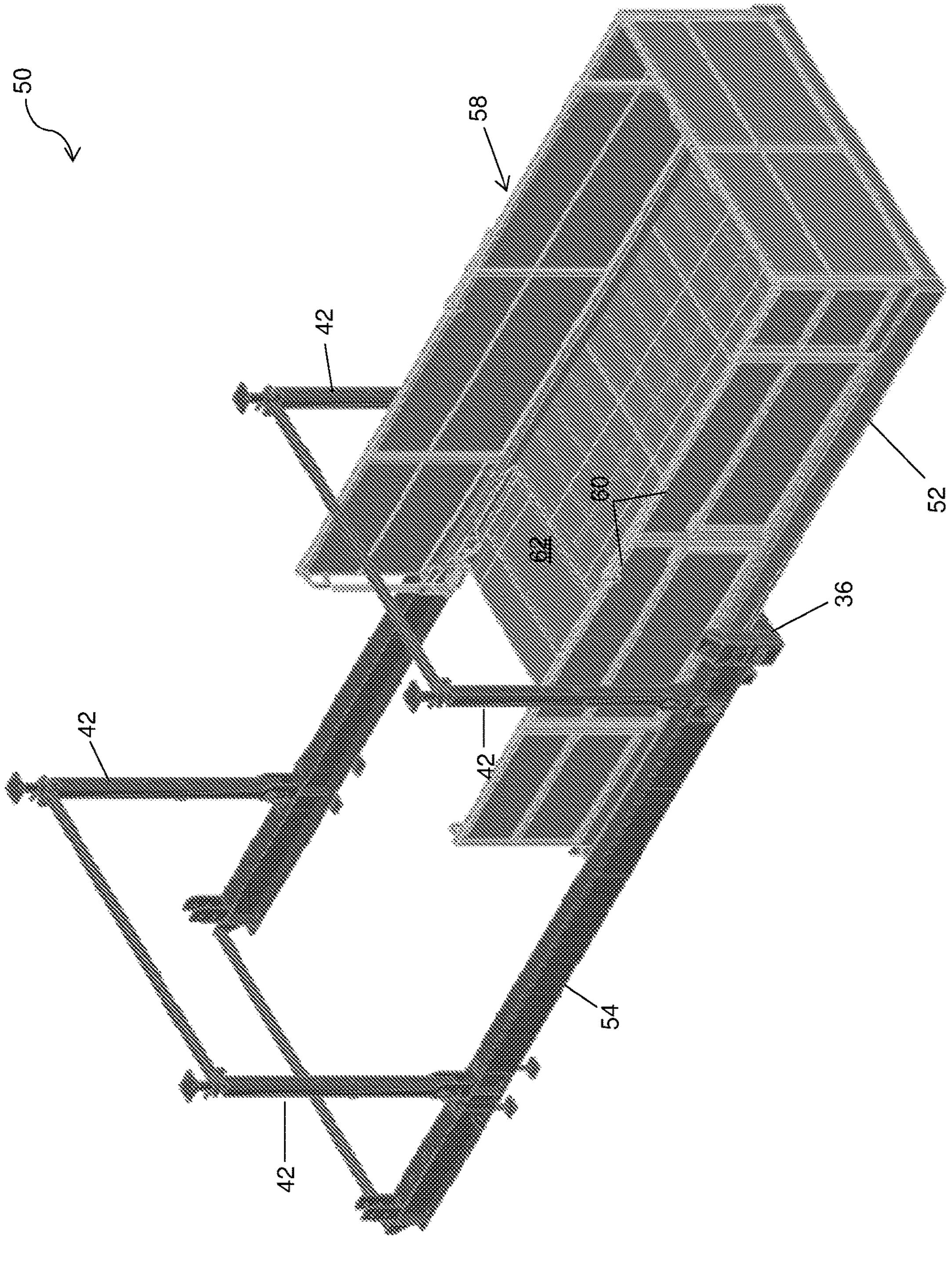
FIG. 6 is a perspective view of the slave loading platform in an extended position.
Figure 7:
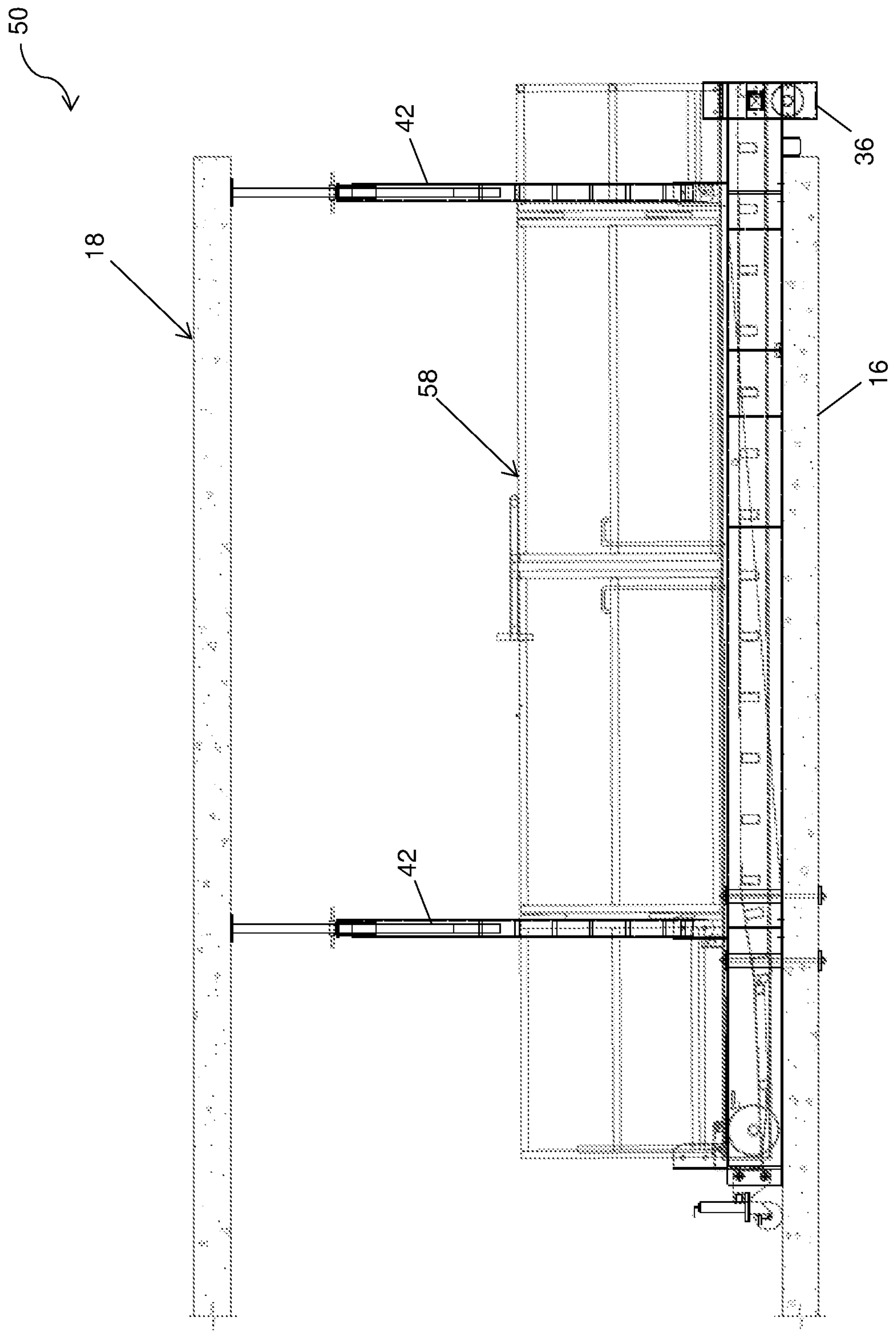
FIG. 7 is a side view of the slave loading platform in a retracted position.
Figure 8:
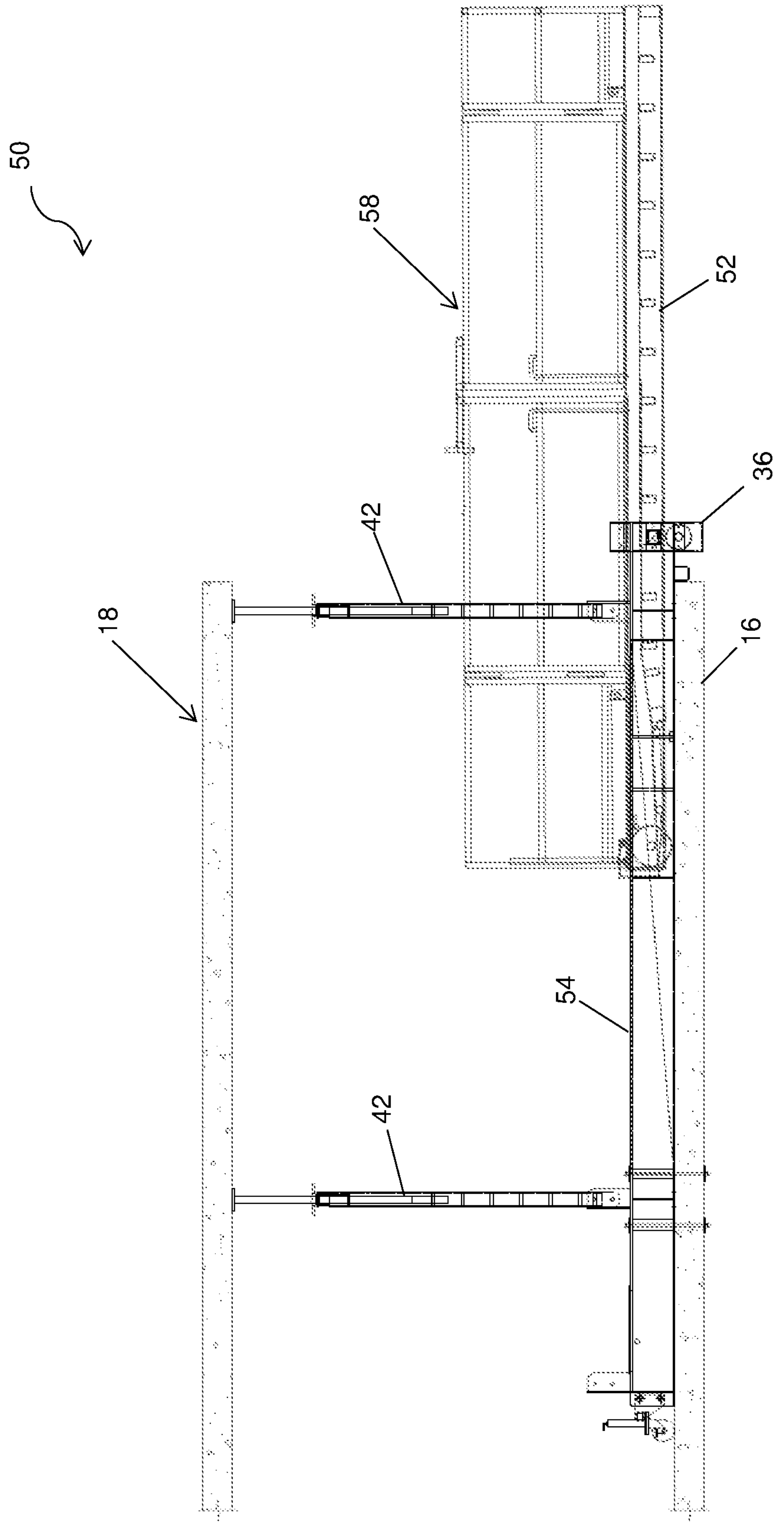
FIG. 8 is a side view of the slave loading platform in an extended position.

Referring to FIGS. 1 to 4, a master hoisting platform 10 according to an embodiment of the present invention generally comprises an inner frame 12 slidable in an outer frame 14. The outer frame 14 may be removably installable inside a floor 16 of a multi-floor building 18 under construction. The inner frame 12 may be slidable, for example on rollers or wheels, between a retracted position inside the floor 16 (FIGS. 1 and 3) and an extended position outside the floor 16 (FIGS. 2 and 4). The inner frame 12 may be lockable in the retracted position and the extended position via locking pins (not shown).

The inner frame 12 may comprise a framework structure 20 to mount a hoist comprising a winch 22 (not shown in FIGS. 1 and 2) positioned rearwardly above the inner frame 12, and a sheave 24 positioned forwardly above the inner frame 12. The framework structure 20 may comprise side and top frame members, and sheave members. A lifting beam 26 may be connected to the sheave 24 and the winch 22 by a wire rope 28 (not shown in FIGS. 1 and 2).

The inner frame 12 may further comprise a rear floor plate 30 below the winch 22, and a front horizontal opening 32 below the sheave 24. A ramp (not shown) may be provided between the floor 16 of the multi-floor building 18 and the rear floor plate 30. As shown in FIG. 4, the front horizontal opening 32 may be configured to vertically receive a loading bin 34.

As shown in FIGS. 3 and 4, the outer frame 14 may extend at least partly beyond an edge of the floor 16 of the multi-floor building 18. For example, the outer frame 14 may comprise a front end cross beam 36 that overlaps the edge of the floor 16 of the multi-floor building 18. As shown in FIG. 3, the hoist may be positioned completely inside the edge of the floor 16 of the multi-floor building 18 when the inner frame 12 is in the retracted position. As shown in FIG. 4, the sheave 24 and the front horizontal opening 32 in the inner frame 12 may be positioned completely outside the edge of the floor 16 of the multi-floor building 18 when the inner frame 12 is in the extended position. The sheave 24 may be horizontally movable relative to the edge of the floor 16 via a chain drive mechanism 25 mounted to an upper forward portion of the inner frame 12. This advantageously allows a load to be to be mechanically moved in and out from the building edge 16.

When the inner frame 12 is in the retracted position, the loading bin 34 may be loaded via a vertical rear opening 38 in the framework structure 20 between the winch 22 and the floor plate 30. When the inner frame 12 is in the extended position, the loading bin 34 may be lifted or lowered through the front horizontal opening 32.

The outer frame 14 may comprise a pair of parallel spaced apart I-beams 40. A pair of props 42 may be spaced apart from one another on each I-beam 42. Each prop 42 may be inwardly foldable from a vertical position to a horizontal position inside the outer frame 14.

Referring to FIGS. 5 to 8, a slave loading platform 50 according to an embodiment of the present invention generally comprises an inner frame 52 slidable in an outer frame 54. The inner frame 52 and the outer frame 54 of the slave loading platform 50 are similar in construction and function to the inner frame 12 and the outer frame 14 of the master hoisting platform 10. The exception is that the inner frame 52 comprises a floor plate 56 having a hand rail structure 58 with a pair of side-opening gates 60 (not shown in FIGS. 7 and 8). A ramp 62 may be provided between the floor 16 of the multi-floor building 18 and the floor plate 56.

When the inner frame 52 of the slave loading platform 50 is in the extended position, a loading bin 34 may be lifted from or lowered onto the floor plate 56 using the master hoisting platform 10. When the inner frame 52 of the slave loading platform 50 is in the retracted position, the loading bin 34 may be loaded or unloaded via the pair of side-opening gates 60 and/or via a rear opening in the hand rail structure 58.

Figure 9:
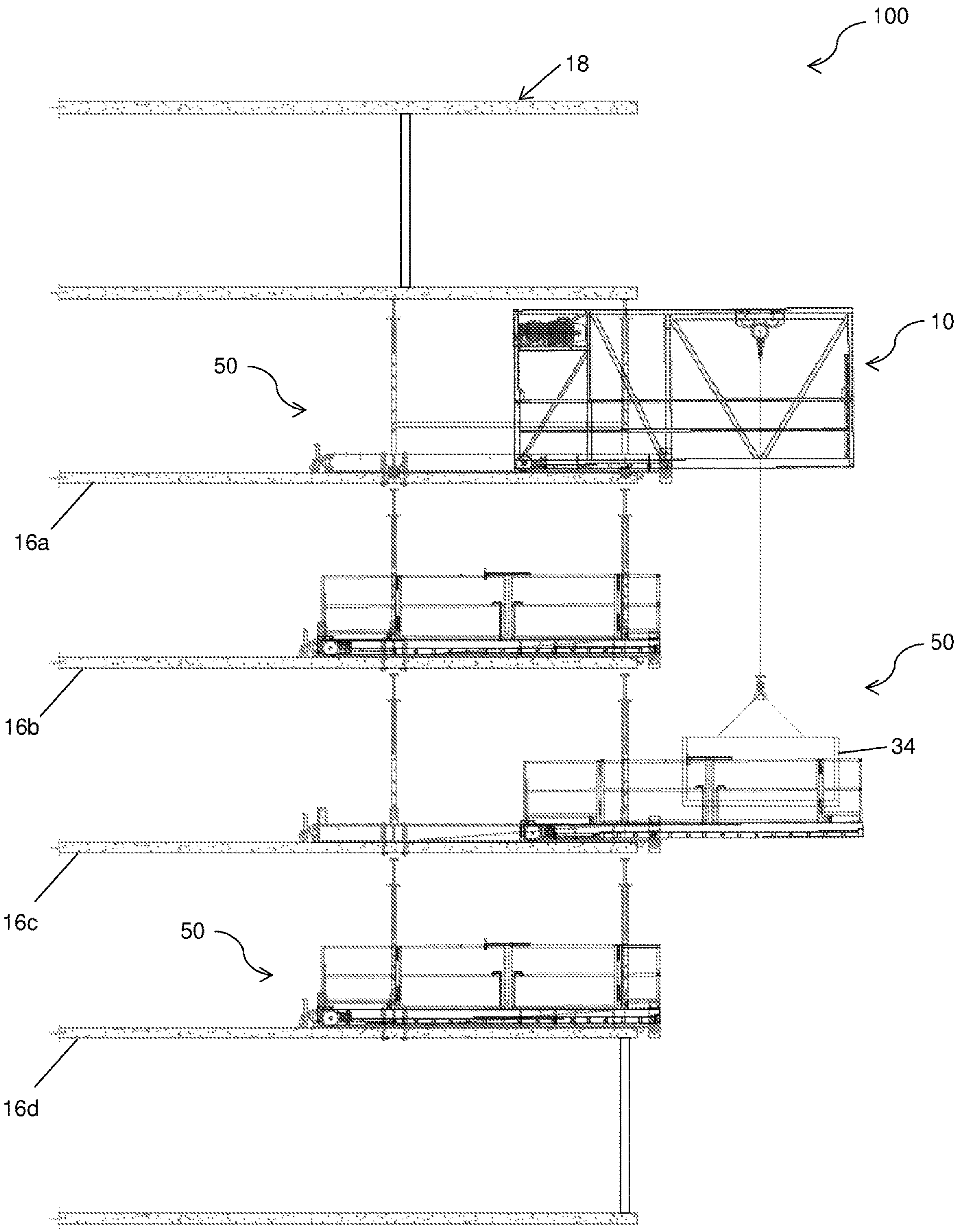
FIG. 9 is a side view of a hoisting platform system for multi-floor building construction according to another embodiment of the present invention.

FIG. 9 illustrates an embodiment of a hoist platform system 100 that generally comprises a master hoisting platform 10 removably installed inside an upper floor 16*a* of the multi-floor building 18, and slave loading platforms 50 removably installed below the master hoisting platform 10 in lower floors 16*b*, 16*c*, 16*d* of the multi-floor building 18. A loading bin 34 may be lifted and lowered between and among the master hoisting platform 10 and the slave loading platforms 50 to lift and lower loads to and from the floors 16*a*, 16*b*, 16*c*, 16*d* during construction of the multi-floor building 18.

Although the slave loading platform 50 has been described by way of example only as suitable for use with the master hoisting platform 10 to provide the hoist platform system 100, it will also be appreciated that embodiments of the slave loading platform 50 may alternatively be used on their own independently of the master hoisting platform 10. In other words, the slave loading platforms 50 may be used as alternatives to, or substitutes for, conventional retractable loading platforms that lack side-loading capability.

Embodiments of the present invention provide hoist platform systems that are useful for lifting and lowering loads during construction of a multi-floor building.

For the purpose of this specification, the word "comprising" means "including but not limited to," and the word "comprises" has a corresponding meaning.

The above embodiments have been described by way of example only and modifications are possible within the scope of the claims that follow.

The invention claimed is:

1. A hoisting apparatus, comprising:
- an outer frame comprising a pair of parallel spaced apart beams;
- an inner frame slidable in the outer frame between a retracted position inside the outer frame and an extended position outside the outer frame;
- wherein the inner frame has a portion that comprises a single unitary framework structure extending above the outer frame;
- wherein the single unitary framework structure comprises side and top frame members, and a single horizontal top sheave member;
- a single winch is horizontally fixed to the single unitary framework structure; and
- a single sheave is horizontally movable away from and towards the single winch inside the single unitary framework structure along and underneath the single horizontal top sheave member.

2. The hoisting apparatus of claim 1, further comprising a pair of props that are spaced apart from one another on each beam of the outer frame, wherein each prop is inwardly foldable from a vertical position above the outer frame to a horizontal position inside the outer frame.

3. The hoisting apparatus of claim 1, wherein the single winch is spaced apart from the single sheave along a length of the single unitary framework structure with the single winch positioned rearwardly in the single unitary framework structure, and wherein the single sheave is positioned forwardly of the single winch in the single unitary framework structure.

* * * * *